(12) United States Patent
Nooren et al.

(10) Patent No.: US 8,885,642 B2
(45) Date of Patent: Nov. 11, 2014

(54) SUPPORT FOR NETWORK ROUTING SELECTION

(75) Inventors: Pieter Albert Nooren, Den Hoorn (NL); Nicolaas Wijnand Keesmaat, Voorburg (NL); Antonius Hendrikus Norp, The Hague (NL); Mattijs Oskar Van Deventer, Leidschendam (NL)

(73) Assignee: Nederlandse Organisatie voor toegepast-natuurwetenschappelijk onderzoek TNO (NL)

( * ) Notice: Subject to any disclaimer, the term of this patent is extended or adjusted under 35 U.S.C. 154(b) by 102 days.

(21) Appl. No.: 13/393,254

(22) PCT Filed: Aug. 31, 2010

(86) PCT No.: PCT/NL2010/050544
§ 371 (c)(1),
(2), (4) Date: May 3, 2012

(87) PCT Pub. No.: WO2011/025380
PCT Pub. Date: Mar. 3, 2011

(65) Prior Publication Data
US 2012/0243532 A1    Sep. 27, 2012

(30) Foreign Application Priority Data

Aug. 31, 2009 (EP) .................................. 09169095

(51) Int. Cl.
*H04L 12/28* (2006.01)
*H04L 29/12* (2006.01)

(52) U.S. Cl.
CPC ........ *H04L 29/12462* (2013.01); *H04L 61/255* (2013.01)
USPC .......................................................... 370/389

(58) Field of Classification Search
None
See application file for complete search history.

(56) References Cited

U.S. PATENT DOCUMENTS

| 6,963,640 B1 | 11/2005 | Manning |
| 7,165,116 B2 | 1/2007 | Grove et al. |

(Continued)

FOREIGN PATENT DOCUMENTS

| EP | 1453278 A2 | 9/2004 |
| EP | 2019535 A1 | 1/2009 |

(Continued)

OTHER PUBLICATIONS

P. Mockapetris, Domain Names—Concepts and facilities; Network Working Group, Nov. 1987, obtained from the internet http://www.ietf.org/rfc/rfc1034.txt on Dec. 13, 2012.

(Continued)

*Primary Examiner* — Minh-Trang Nguyen
(74) *Attorney, Agent, or Firm* — Banner & Witcoff, Ltd.

(57) ABSTRACT

An address for controlling transmission of routing through a network is obtained by means of input from a combination of network terminals. Initially, address describing data is received from a user via a source terminal. A control circuit determines whether the address describing data is sufficient to define an address of a destination. If not, the control circuit uses the address describing data to extract information must be met by the destination, but for which it is not known for specific destinations whether it is met. The information may define a desired property of the destination for example, or a mutual relation between the user and the destination. The control circuit then transmits a confirmation request to one or more possible destinations, to ask whether information relates to the possible destination. If a positive confirmation is received back from a possible destination, the address of this possible destination is used. Information that the information relates to the possible destination may be stored to resolve future address describing information.

11 Claims, 4 Drawing Sheets

(56) References Cited

U.S. PATENT DOCUMENTS

| | | | |
|---|---|---|---|
| 7,472,201 | B1 | 12/2008 | Aitken |
| 7,639,690 | B2 * | 12/2009 | Mawatari et al. ............. 370/392 |
| 2002/0143548 | A1 | 10/2002 | Korall et al. |
| 2002/0187773 | A1 | 12/2002 | Woods |
| 2004/0153519 | A1 | 8/2004 | Stolze |
| 2004/0215726 | A1 | 10/2004 | Arning et al. |
| 2004/0252677 | A1 | 12/2004 | Kushita |
| 2006/0129665 | A1 | 6/2006 | Toebes et al. |
| 2007/0055656 | A1 | 3/2007 | Tunstall-Pedoe |
| 2008/0026774 | A1 | 1/2008 | Fraccaroli |
| 2008/0310639 | A1 * | 12/2008 | Kanda et al. ................. 380/283 |

FOREIGN PATENT DOCUMENTS

| | | |
|---|---|---|
| GB | 2445667 | 7/2008 |
| WO | 02/29636 | 4/2002 |
| WO | 03/081860 | 10/2003 |
| WO | 2007/101973 | 9/2007 |
| WO | 2009/064694 | 5/2009 |

OTHER PUBLICATIONS

P. Mockapetris, Domain Names—Implementation and specification; Network Working Group, Nov. 1987, obtained from the internet http://www.ietf.org/rfc/rfc1035.txt on Dec. 13, 2012.

N. Popp et al.; Context and Goals for Commom Name Resolution; Network Working Group, Oct. 2000, obtained from the internet http://www.tools.ietf.org/html/rfc2972.txt on Dec. 13, 2012.

N. Popp et al.; Commom Name Resolution Protocol (CNRP); Network Working Group, Aug. 2002, obtained from the internet http://www.tools.ietf.org/rfc/rfc3367.txt on Dec. 13, 2012.

M. Mealling et al.; The 'go' URI Scheme for the Common Name Resolution Protocol; Network Working Group, Aug. 2002, obtained from the internet http://www.tools.ietf.org/html/rfc3368.txt on Dec. 13, 2012.

European Search Report, EP09169096, Date of completion: Feb. 5, 2010.

European Search Report, EP09169098, Date of completion: Jan. 22, 2010.

International Search Report—PCT/NL2010/050543, date of completion, Nov. 24, 2010.

International Search Report—PCT/NL2010/050542, date of completion, Nov. 24, 2010.

International Search Report—PCT/NL2010/050544, date of completion, Nov. 24, 2010.

* cited by examiner

US 8,885,642 B2

SUPPORT FOR NETWORK ROUTING SELECTION

CROSS-REFERENCE TO RELATED APPLICATIONS

This application is a U.S. National Stage application under 35 U.S.C. §371 of International Application PCT/NL2010/050544 (published as WO 2011/025380 A1), filed Aug. 31, 2010, which claims priority to Application EP 09169095.8, filed Aug. 31, 2009. Benefit of the filing date of each of these prior applications is hereby claimed. Each of these prior applications is hereby incorporated by reference in its entirety.

FIELD OF THE INVENTION

The invention relates to equipment for directing data that is routed through a network and to a method of directing data through a network, by resolving user supplied address describing data.

BACKGROUND ART

A key part of the human-machine interface of communication equipment involves the selection of destination addresses by the user. For example, to establish a telephone call a telephone number of the called party has to be selected and to send an e-mail an e-mail address of the destination has to be selected.

Powerful support tools have been provided in communication equipment to assist human users that do not know the necessary addresses by heart. For example, an electronic directory database may be provided, that can be queried with incomplete information about the destination. The database provides the complete address if only one address is consistent with the incomplete information, or else presents the user with a request to choose from a list of consistent addresses.

It is also known to use historical data about previously established communication links in support of address selection. Thus, for example when a user specifies an incomplete destination address the support tool may search for a matching address in a table that contains destination addresses that the user has used in earlier transmission.

Unfortunately, this type of support tool still does not handle many cases wherein the user cannot provide the address by heart. For example, it still is awkward to use "subjective" information that has meaning for a limited number of users, but not for all other users.

WO2009/064694 describes a system for enabling unacquainted persons to establish contact after their paths have crossed by chance. When a person would like to contact another person, he or she can each send a "match request" to the system via his or her mobile telephone for example. The match request contains encounter information that identifies the time and place at which their paths crossed. The system is configured to identify pairs of such match requests with correlated encounter information. The system receives match requests from large numbers of persons and searches for pairs with matching event information. If it finds such a pair, the system connects the persons, for example by connecting the mobile telephones from which the match requests of the pair were received. WO2009/064694 is only concerned with finding matching requests from pairs of persons that both try to contact each other, not with unilateral requests to address another user. Once a pair of matching requests has been confirmed, it would be contrary to the document to use these match requests to try and confirm other pairs.

The document describes the possibility that the system transmits verification questions, like "at which platform did we part?", from one person to another, prior to establishing the connection. The answers to the verification questions help users decide whether they will accept the match. WO2009/064694 does not suggest that verification questions are used by the system itself in its initial search for pairs of match requests, let alone that the answers to the questions may be used by the system to resolve later requests. In WO2009/064694 it suffices that a person provides a verification questions after a matching person has been found, possibly dependent on the information, or lack of it, in the event information from the matching person.

US2008/0026774 describes a computer dating service that makes use of a wireless communication network. The system compares stored user profiles of users of mobiles that are present in the same network cell at the same time and when a match is found, the users are put in contact, or advised of each others presence. In this system, matching depends on information that is provided in the database before the mobiles are in the same cell.

WO 02/29636 describes a system for finding a target person on the Internet. The system uses a database with information about registered persons. A person that wishes to find a target person provides some personal on the target person and sends a request with that personal information to the system. When it receives the request, the system compares personal information with information about registered persons. When a matching candidate is found, the system sends a query to the candidate to determine whether the registered information of the candidate may be revealed to the person that submitted the request to find the target person. In this system, matching entirely depends on information in the database about registered persons.

SUMMARY

Among others, it is an object to provide for a communication apparatus with an improved support tool for translating a user supplied description of a destination into a destination address for routing information through a network.

A method according to claim 1 is provided. Herein one or more other destinations are asked to provide a response to resolve address describing data from a first user. The address describing data may be received for example in the form of a string of character codes or a speech signal. A control circuit tests whether the address describing data from the first user is sufficient to define an address of a destination.

If not, the control circuit uses the address describing data to extract information must be met by the destination, but for which there is no record for specific destinations whether it is met. That is, the control circuit uses the address describing data input that the first user provided before completion of the search for the destination to extract this information. The information may define a desired property of the destination for example, or a mutual relation between the user and the destination. The control circuit then transmits a confirmation request to one or more possible destinations, to ask whether information relates to the possible destination. If a positive confirmation is received back from a possible destination, the address of this possible destination is used by the system (by network address resolution equipment, or an address generator).

In an embodiment a record may be stored in response to reception of the positive confirmation and/or negative confirmations, representing that the information applies to the further user. This record makes it possible for the control circuit to resolve further address describing data from both the original user and the further user and/or from other users that have attributes that have been found to match those of the original user.

BRIEF DESCRIPTION OF THE DRAWING

These and other objects and advantageous aspects will become apparent from a description of exemplary embodiments, using the following figures

DETAILED DESCRIPTION OF EXEMPLARY EMBODIMENTS

Figure 1:
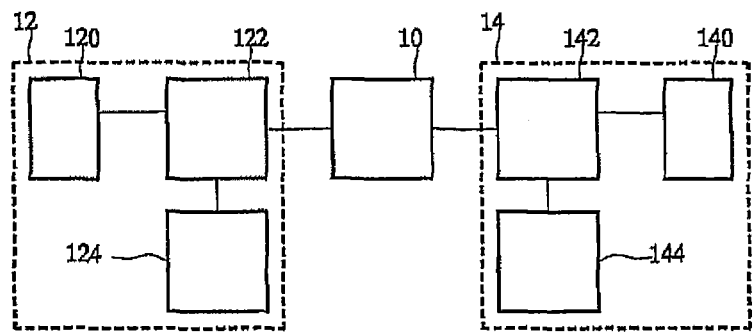
FIGS. 1 and 2 show communication systems

FIG. 1 shows a communication system, comprising a network 10, a first user terminal 12 and a second user terminal 14. Network 10 may be a telephone network, a local area network or the Internet for example. Network 10 interconnects a plurality of terminals and provides for routing data through the network to a selectable destination terminal based on address describing data supplied from a source terminal of the data, for example.

First and second user terminal 12, 14 each comprise a user interface 120, 140, a network terminal device 122, 142 and an address resolution database memory 124, 144. The network terminal device 122, 142 of each terminal is coupled to network 10 and the user interface 120, 140 and address resolution database memory 124, 144 of the terminal.

Address resolution database memories 124, 144 contain support information for translating address describing data that is received from user interfaces 120, 140 into addresses for controlling routing in network 10. The support information defines translation of terms from the address describing data from the user interfaces 120, 140 to enable selection of addresses. The support information may be context sensitive for example because the translation is defined only for selected source-destination pairs. The support information in the address resolution database memory 124, 144 may include information generated by the user at the user interface 120, 140 of the terminal that contains the address resolution database memory 124, 144, but also information generated at another terminal.

The communication system provides for communication of address resolution database information between first and second user terminal 12, 14. This is shown symbolically by means of a connection between address resolution database memories 124, 144. However, it should be appreciated that the database information is preferably communicated via network 10. The network terminal devices 122, 142 in a terminal may be configured to provide for the communication of database information by writing locally to the address resolution database memory 124, 144 in the terminal and remotely to the address resolution database memory 124, 144 in another terminal.

Figure 2:
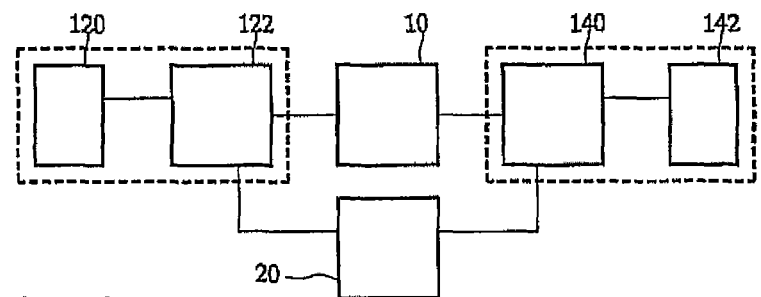

FIG. 2 shows an alternative embodiment, wherein the support information is kept in a shared database memory 20 that is accessible from all user terminals, or only from a predetermined group of user terminals, such as user terminals coupled to a local network domain. Although separate connections to shared database memory 20 may be used, it should be understood that connection to shared database memory 20 may be realized via network 10. In a further embodiment a combination of local address resolution data base memories 124, 144 and shared database memory 20 may be used. Shared database memory 20 itself may be located in a single device or it may be distributed over a plurality of devices, which may have separate connections to network 10.

Shared database memory 20 may be part of an address resolution system (not shown) that furthermore comprises a processor configured to receive address describing data from user terminals 12, 14, to translate the address describing data into addresses for controlling routing in network 10 and to return the addresses to user terminals 12, 14 or to supply them to network 10 directly to control routing through the network.

In each embodiment the address describing data from user terminals 12, 14 and, for such address describing data for which this is necessary, the support information from address resolution database memory 124, 144 and/or shared database memory 20 is used to derive addresses for controlling routing in network 10 or information that uniquely defines these addresses from the combination of the address describing data and the support information. The derivation of the addresses may be performed by a processor in the network terminal device 122, 142 of the user terminal 12, 14 in which the address describing data was entered, or in a processor of the address resolution system that comprises shared database memory 20, or distributed over these devices.

The resulting addresses may be supplied to network 10 to control routing of information through the network 10, for example to route an e-mail message and in a particular example to set up a communication channel such as a telephone connection or a channel for a data stream to a printer or a display device, or from a media streamer. The address may be supplied to network 10 directly from the processor that has performed the resolution, or indirectly, by first transmitting the address or information that uniquely identifies the address to another network terminal, from where it may be used to control routing of information through the network 10.

Representation of the Support Information

In an embodiment the support information comprises a set of records that represent assertions about persons associated with routing destinations in network 10. The assertions include assertions about values of attributes of the destinations, such as user name, location etc, as well as assertions about events relating destinations, such as communication contacts that have taken place between users.

In a simple embodiment the support information may comprise a set of records that each defines an assertion in the form of a respective text string and an identifier of a destination that is associated with the text string.

In an embodiment at least part of the records may comprise a weight parameter and/or a creation date parameter, for computing a weight assigned to the record. In an embodiment additional dependent records may be provided that represent use that has previously been made of the records that represent assertions, or information representing use may be included in the records that represent assertions themselves.

Each user of the communication system may represented by a unique identifier ID. Records may be provided representing assertions, wherein each record defines the type of assertion (the predicate) and the respective values or respective ranges of values that are asserted for respective parameters of the assertion. In the following records will be denoted by a list of items between brackets such as (family name, ID1, Adams) or (contacted, ID1, ID2, by telephone, 1-1-2000), wherein the first item of the list defines the type of assertion and the remaining items represent parameter values. If needed the names of the parameters will be included: (contacted, source=ID1, destination=ID2, mode=by telephone, date=1-1-2000).

In the present description forms of information storage that represent assertions will be denoted by such lists. Address resolution data base memories 124, 144 and/or shared database memory 20 may store a table of such lists as a representation of the assertions. However, it should be appreciated that equivalent form of storage may be used, such as storage in multiple tables. For example, different tables may be used for different types of assertion. For example a record may assert that the name of a person is "Adams". In this case a record (family name, ID, "Adams") may be stored in a family name table, wherein ID is the value of an identifier of a person.

The identifier ID may be a destination address of the person in network 10. Alternatively, any other type of identifier may be used, the destination address being stored in a record asserting that the destination address of the ID has a specific value. Thus the type of assertion is implicit from the table in which the assertion is stored. Similarly, one or more of the identifier values may be made implicit by using different tables for different identifier values. When records representing assertions are stored in local address resolution database memories 124, 144, the parameters that specify the user of the terminal that contains resolution database memories 124, 144 may be left implicit. Thus for example, the "source identifier" parameter of a record for a "contacted" assertion may be left implicit in the local address resolution database memory 124 of the user terminal from which the contact was established. When a shared database memory 20 is used, such parameters are preferably specified explicitly.

In an embodiment, a predefined system of types of assertion (predicates) is used. The definition may distinguish the assertion types into single-valued (exclusive) assertion types and multi-valued assertion types. For example a "date of birth" assertion type may be of the single valued type, because only one value is allowed for each specific identifier ID, whereas a "contacted" assertion type may be multi-valued, allowing records for different values for the same identifier.

Each assertion type defines the number of parameters of the record defining the assertion. Assertions that define attributes of a destination basically only have a parameter that represents an attribute value for a specific attribute type and a parameter that defines the object (e.g. destination) to which the attribute value applies. Examples of such attribute value assertions are "date of birth", "first name". For example a "first name" record (first name, ID1, John) may contain an identifier ID1 of the person involved and a value "John". An example of an assertion type with more parameters is "contacted", which may have a source identifier, a destination identifier, a date and a mode of communication as parameters for example. Redundant records may be used. Thus for example an assertion about a family name may be stored both in a table of family names (e.g. as (family name, ID, Adams)) and in a table of name values that has the name type as parameter (e.g. as (name, ID, family name, Adams)).

In a record a range of value may be defined for the value of a parameter. Thus, instead of defining a date as value for a data parameter, a range of dates, e.g. a week from a specific date may be used, to assert that the date value is in that range. Parameter values may also be left unspecified, to assert that any value is possible.

Information may be stored that represent use that has previously been made of the records that represent assertions. In a simple embodiment each of these records may have a field representing such use, for example in the form of a date on which the record was last used successfully to deliver an address that was accepted by a user. Additionally a field for an identification of that user may be included in the record.

In more advanced embodiments dependent records may be provided that represent instances of the records that represent assertions. Such dependent records may take the form (Assertion reference, success/no success flag, date of use), wherein the assertion reference identifies the assertion to which the dependent record refers, the success/no success flag represents whether the assertion was last used successfully to deliver an address that was accepted by a user and the date of use is the date at which the instance took place. Optionally, a User ID and a Result ID may be included in the record, the User ID identifying the user for which the record was used and the Result ID identifying the result that was obtained by using the assertion.

In an embodiment at least part of the records may comprise a weight parameter and/or a creation parameter. These may be used for computing a weight assigned to the record, or for managing discarding of records. Instead of the creation data an age value of the record may be stored.

Processing a Description of the Destination

Figure 3:
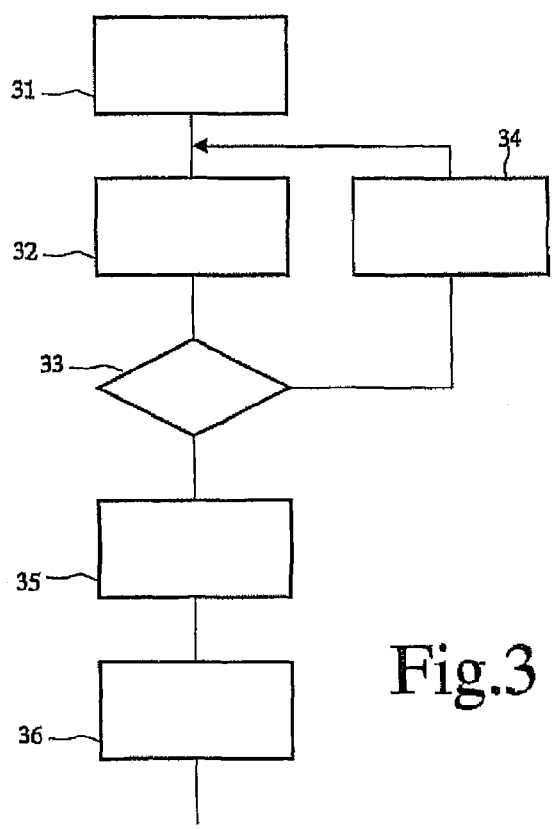
FIG. 3 shows a flow-chart of communication

FIG. 3 shows a flow-chart of a communication process between first user terminal 12 and second user terminal 14. In a first step 31, first terminal 12 receives an initial part of address describing data to determine a destination of a data to be routed from the user via user interface 120 through the network. Additionally, first terminal 12 may receive a definition of a content of a message to second user terminal 14 from the user via user interface 120. As used herein, the term "address describing data" to determine a destination encompasses pieces of information such as strings of character codes that are not explicit addresses or unique aliases for addresses. In fact, at least initially, the address describing data need not uniquely identify the destination. The address describing data may be obtained by receiving character codes of characters typed in by the user, or by speech processing of a received speech signal.

In a second step 32 an information item is derived from the address describing data. This may be done by a data processor in network terminal device 122, 142, or by a data processor in an address resolution system that comprises shared database memory 20, the data processor having a program memory with a stored program to cause it to do so. In a third step 33 the data processor tests whether the information item, if need be in combination with data from address resolution database memory 124 and/or shared database memory 20, is sufficient to determine a destination address with certainty.

In a simple embodiment, wherein the records of the database memory 124 and/or shared database memory 20 comprise text strings and destination identifiers associated with those text strings, second step 32 may be implemented by taking a set of words or substrings from the address describing data and third step 33 may be implemented by searching for records with text strings that contain these words or substrings.

Optionally, the data processor may compute match scores between text strings from the records and information derived from the address describing data. In this option, records may be selected in order of their match scores and/or by comparing their match scores with threshold values.

In another embodiment of second step 32 the data processor parses the description of the destination into information elements that describe the destination, for example by extracting definitions of values, such as words from the address describing data, and an association of those values with identified attributes. Each information element may be converted in a data record that represents an assertion applicable to an unidentified destination, for example an assertion from the predefined system of types of assertion, defining values or ranges of values of the parameter of the assertion. Parsing may be executed by a data processor (not shown) in user interface 120 or a data processor (not shown) in network terminal device 122 for example.

In a simple embodiment, parsing is facilitated by using a dialog box user interface, wherein the user has to identify the assertion type and the parameters for which values are supplied. In more advanced embodiments some form of natural language parsing may be used. A number of keywords may be defined, such as "from", "contacted", "called", "telephoned", "e-mailed" that correspond to assertion types optionally with specific parameter values. For example both "telephoned" and "e-mailed" may correspond to "contacted" but with mode parameter values of by telephone and by e-mail respectively. The data processor may be configured to search for such keywords and accompanying terms that define parameter values of the corresponding assertion types.

When the user supplies explicit address information in the address describing data, parsing may result in information that explicitly represents the address needed to control routing in network 10. This is the case for example when the address describing data comprises the digits of a telephone number and network 10 is a telephone network, or a complete e-mail address when network 10 supports e-mail traffic. In the latter case network terminal device 122 may use at least part of the e-mail address that represents the destination hardware address (the part behind the symbol "@") in a request to a domain name server that uniquely translates this part to an address for controlling network 10.

In an embodiment, a parsing algorithm is used that translates the address describing data into a set of information elements, also termed information items, that each indicate an assertion type and parameter value or range specifications for that assertion type, wherein the assertion type is selected from the predefined system of assertion types. For example parsing of address describing data "to Adams from Washington, whom I telephoned last week" may result in elements (Name, identifier=X, value=Adams), (From City, value=Washington), (contacted, destination=X, mode=telephone, date=range defined by "last week") for the unknown destination X, wherein the assertion types are "Name", value "From City", and "contacted" and selected parameters of records for these assertion types are specified.

The processor may use conventional database search techniques to search for identifiers for which there are records with assertions that match the assertions for the destination defined by the information elements, as they have been parsed from the address describing data. In a simple embodiment this may involve going through all records in database memory 124 and/or shared database memory 20 for each information element, to identify records that match with the information element, in the sense that they relate to corresponding assertion types and have parameters or parameter ranges consistent with the parameters or parameter ranges specified in the information elements. Thus, each information element results in a set of identifiers for which corresponding assertions are found.

When exclusive (single valued) assertion types are used, destination identifiers Y from these set can be eliminated if the single parameter value for such an assertion type for that destination identifier Y is inconsistent with the parameter value specified in the element for that assertion type, as parsed from the address describing data.

A unique address for the unknown destination X can be found from these records if the set of elements for the unknown destination X that has been parsed from the address describing data is sufficient to limit search results to a single destination X. The unique address may be a telephone number or an IP address for example, or a domain name that can be uniquely translated to an IP address using a domain name server. However, if the address describing data of the destination contains and/or address resolution database memory 124 and/or shared database memory 20 contain too little information unique resolution may not be possible.

In an embodiment of third step 33 the data processor tests whether the information from the address describing data, if need be in combination with data from address resolution database memory 124 and/or shared database memory 20, is sufficient to determine a destination address with certainty. That is, it determines whether there is a single destination identifier X for which address resolution database memory 124 and/or shared database memory 20 contain assertions corresponding to those specified in the address describing data and that there is no other destination identifier for which the assertions do not contradict the description of the destination.

If the destination address cannot be determined with certainty, the data processor proceeds to a fourth step 34, wherein it prompts the user to supply additional information to augment the address describing data. The additional information may be entered from user interface 120. From fourth step 34, the process is repeated from second step 32 using the augmented address describing data. By way of example, the user might respond to the prompt of fourth step 34 by adding "whose first name is John", corresponding to an additional element (Name, position="first name", identifier=X, value="John") for the unknown destination X. Third step 33 and fourth step 34 may be repeated until that the address describing data is sufficient to determine a unique destination address.

In an embodiment the data processor is configured to use a directed query in the prompt of fourth step 34. Thus for example, the data processor may be configured to test whether more than one but less than a predetermined number of alternative values of the destination identifier X are consistent with the address describing data, and to cause user interface 120 to present a list of the possible values, asking the user to select one of these values if there are less than the predetermined number of possible values.

The data processor may be configured to indicate a selected parameter of a selected one of the elements or assertions from the data base and to cause user interface 120 to request the user to fill in a parameter value for the selected parameter, when there are more than the predetermined number of possible parameter values. The data processor may be configured to select the element and the parameter for example by detecting whether a selection of the element and the parameter will resolve the destination. Thus for example, if it is detected that the address describing data leaves a plurality possible persons that all have different name values in the assertions for the first name, the user interface 120 may be made to ask for the value of the name parameter for the first name. As another example, when the address describing data leads to an element (contacted, source=ID1, destination=X) and it is found that a number of assertions with different dates matches this assertion, the user interface 120 may be made to prompt for the date at which the message was sent.

Once it has been determined in third step 33 that the address describing data, if need be in combination with data from address resolution database memory 124 and/or shared database memory 20, is sufficient to determine a destination address with certainty, a fifth step 35 is executed, wherein network terminal device 122 transmits the message using the destination address that follows from the address describing data. Optionally, an additional step (not shown) is executed before fifth step 35, wherein the data processor causes user interface 120 to ask the user to confirm the selected destination. In this embodiment the data processor proceeds to fifth step 35 if a confirmation of the selection is received and otherwise it proceeds to fourth step 34 to obtain more information. When the additional step is used the flow from third step 33 to fourth step 34 may be omitted.

In an embodiment ranking of search results is used. Score values S(ID) are computed for respective possible destination identifiers ID and the identifiers are ranked according to these scores. In this embodiment the additional step before fifth step 35 may involve presenting the destination corresponding to the best ranking identifier as selected destination. Alternatively, the user may be asked to input a selection from a plurality of destinations in the additional step, the plurality including the destinations corresponding to the best ranking identifier and other identifiers with a score within a threshold distance from the score of the best ranking identifier or identifiers with ranks above a predetermined limit.

The score values may be computed using weight factors associated with the assertions. In an embodiment a product of the weight factors of different assertions used in arriving at a destination identifier may be taken to compute the score value. Assertions for which no weight factor is available may be taken to have a weight value of one, so that they can be left out of the product. Thus, if an identifier is arrived at based on a part of the address describing data "whom I contacted last week", corresponding to an element (contacted, destination=X, source=ID1, date=range defined by last week), and the database contains a record (contacted, destination=ID2, source=ID1, mode=by telephone, date=range defined by last week,), the identifier may be assigned a score value derived from a weight factor of the that assertion. If alternative routes exist to arrive at a destination identifier, the score value for that identifier may be computed as a sum of the score values for the alternative routes.

In an embodiment, each assertion may have a respective assigned weight factor independent of the address describing data. In this case the weight factor may be stored as a field of the record that represents the assertion, or it may be computed from the values of other field of the record. For example, the weight factor may be computed as a predetermined function of the age of the last successful use of the record, or of the overall age of the record, the factor decrease from one for zero age to a lower value for a high age.

The associated weight may be a predetermined function of the age of the assertion, for example, or a product of an associated weight and such a function. As another example, the associated weight may depend on the use that was made of the assertion by others, a higher weight being assigned when an address obtained from the assertion was previously used for addressing.

In another embodiment, the weight factor may be assigned dependent a source-user matching score between properties associated with the source of the record and properties associated with the source of the address describing data. An initial weight factor may be assigned that grows with this source-user matching score. The source-user matching score may be computed for example by the steps of (a) reading records that associate attribute values with an identifier of the user that specified the address describing data; (b) reading a source identifier of the source of an assertion from a field of the record that represents the assertion; (c) retrieving records that associate attribute values with the source identifier; (d) computing distance measures between the read-out attribute values for corresponding attribute types; and (e).computing the initial weight factor from the distance measure, assigning more weight when the distance is smaller. The distance measure may be one of zero dependent on whether the attribute values are equal or not, for example.

In another embodiment, the weight factor may be assigned dependent on the identity of the source of the address describing data and/or the resulting destination. Predetermined higher and lower initial weight factor values may be assigned when resolving current address describing data for example dependent on whether or not it has been recorded that the record that represents the assertion has previously been used successfully to find the identity of the user that has provided the current address describing data.

To support this, the record that represents the assertion may comprise a field for storing an identifier of the last previous successful result obtained with the assertion (that is a result that has been accepted by another user). Alternatively, dependent records for different instances of previous successful use may be kept, containing an identifier of the results of those instances. To determine the initial score value, the content of this field or of the dependent records is read and the resulting identifier or identifiers is or are compared with the identifier of the user that has provided the current address describing data. Dependent on the result of the comparison a higher or lower predetermined initial weight factor is chosen when the identifiers match and do not match respectively. In a further embodiment, the selected initial weight factor may subsequently be modified according to a predetermined function of the age of the previous successful use, for example by multiplication with a predetermined function or the age. Similarly selected initial weight factor may be modified according to an intrinsic weight value assigned to the record, for example on the basis of the age of the record.

In another embodiment predetermined higher and lower initial weight factor values may similarly be assigned when resolving current address describing data dependent on whether or not it has been recorded that the record that represents the assertion has previously been used successfully by another identified user and that this user matches the result of the resolution of the current address describing data. In an embodiment, the weight values of assertions may be updated dependent on whether the identifiers that were arrived at using the assertions are rejected or confirmed in the additional step. The new weight value W' may be determined from the old weight value W according to a function W'=F1(W) or W'=F0(W) dependent on whether the selection was confirmed or rejected respectively, the function F0 reducing the weight by multiplication by a factor smaller than one and the function F1 reducing the one minus the weight by multiplication by a factor smaller than one. In other embodiments other forms of update may be used.

Update of Support Information

Subsequent to fifth step 35, or before fifth step 35 or in parallel with it, a sixth step 36 is executed, wherein the data processor augments the information in address resolution database memory 124 of the first user terminal 12, as well as the information address resolution database memory 144 of the second user terminal 14 and/or shared database memory 20, based on the address describing data.

In a simple embodiment a record may be added that comprises and an identifier of the destination and text from the address describing data. In the case of assertion-types for which a plurality of concurrent values is allowed for the same destination, records may be added in address resolution database memory 124 of the first user terminal 12 associated with the destination address that has been found in third step 33, when records with similar content were not yet stored.

For example the address describing data may contain a term "whom I telephoned last week" which results in an element (contacted, destination=X, mode=telephone, date=range defined by "last week"). Information to this effect may not be present in the database, for example when the communication did not involve first user terminal 12. In this case an assertion of the type "contacted" is stored in address resolution database memory 124, with the identifier value ID that has been found for X substituted in the destination address value. A record (destination=ID, mode=telephone, date=range defined by "last week") may be added.

In this way it is made possible to resolve the address describing data "whom I telephoned last week" in third step 33 of a future execution of the process to establish another connection. This profits from the fact that the user found this information relevant for describing a destination. When this address describing data was initially useless because it did not match with any record in the database, it is made useful for handling future address describing data by including it in the database, associated with a specific ID value that was selected by the user upon further prompting.

In addition date information may be added to the record, indicating the date at which the record was created. This may be used to compute the age of the record, which in turn may be used to assign weight to the record, or to manage discarding of the record. In an embodiment an added assertion may have a parameter with a value that indicated the specifying source of the assertion. The specifying source may be used to determine whether the assertion should be used, for example only if the source of the address describing data and the source of the assertion have matching properties. This information may also be used to assign weights to the assertions.

Typically, the database is augmented with an assertion of a type that was derived from the address describing data with at least a parameter value (typically a destination ID) that was received in response to a prompt. However, when the original address describing data already contained sufficient information to resolve the destination plus an assertion that was merely insufficient and did not match with any record in the database, this assertion may also be added to the database for future use.

In the embodiment wherein shared database memory 20 is used, sixth step 36 may comprise storing a corresponding record (source=ID1, destination=ID, mode=telephone, date=range defined by "last week") in shared database memory 20, wherein the identifier value ID1 of the source of the message is derived from an owner ID1 value stored in first user terminal 12, or derived from a source address used by first user terminal 12.

Because this information is added to shared database memory 20, it is made available to all user terminals 12, 14 for use to resolve future address describing data. In particular, it also becomes available to the second user terminal 14 that is the destination of the current message. Thus, use of address describing data "who contacted me" from that terminal.

At a later time, the user of that second user terminal 14 may indicate a destination of a next message as "Jefferson, who contacted me last week", which will be parsed into elements (family name, identifier=X, "Jefferson") and (contacted, source=X, destination=ID2, date=range defined by last week), wherein ID2 is the user identifier associated with second user terminal 14. The process of FIG. 3 is applied to addressing of this next message. In this case, third step 33 will be able to resolve the address describing data using the record (source=ID1, destination=ID, mode=telephone, date=range defined by "last week") that was added in sixth step 36 when handling a previous message.

In embodiment of sixth step 36, such an added record may be stored in address resolution database memory 124, 144 of both individual terminals 12, 14 instead of, or in addition to storing in shared database memory 20. In this embodiment, in sixth step 36 the data processor may cause a record (contacted, source=ID1, destination=ID2, mode=telephone, date=range defined by last week) to be stored in the address resolution database memory 144 of the destination terminal.

In an alternative embodiment, wherein the identifier corresponding to the respective user terminals 12, 14 is left implicit in address resolution database memories 124, 144 of these terminals, mutually different assertions may be stored in the respective user terminals 12, 14, defining related assertions with different implicit parameters. The relation between the assertions may be predefined when the assertion types are defined. Thus a relation from a "contacted" assertion type to "contacted by me" and "contacted to me" assertion types may be defined, with corresponding parameter mappings between the assertions.

In this alternative embodiment, the data processor applies these definitions to convert an assertion (contacted, source=ID1, destination=ID2, mode=telephone, date=date range) to assertions (contacted by me, destination=ID2, mode=telephone, date=date range) and (contacted to me, source=ID1, mode=telephone, date=date range) and causes the converted assertions to be stored in the address resolution database memories 124, 144 of the sending first user terminal 12 and the receiving second user terminal 14 respectively. Thus, the second user terminal 14 is enabled to use this information for the resolution of address describing data of future messages.

In an embodiment of sixth step 36 a new record is always stored, even if the new record is a version of an existing record, the new record defining more specific values of the parameters of an assertion than the existing record. Alternatively, sixth step 36 may avoid creating a new record, the existing record being modified instead to replace the parameter value specifications by more specific value specifications. This reduces the amount of storage required, but addition of a new record has the advantage that the more general previously existing record remains available for address resolution.

Figure 4:
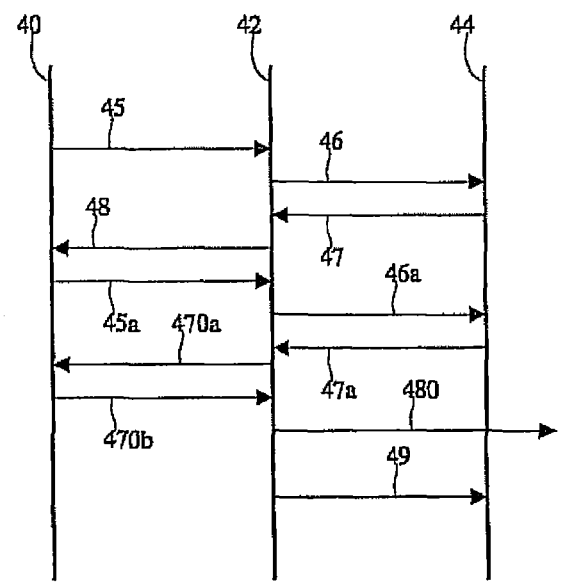
FIG. 4 illustrates information exchange

FIG. 4 shows information exchanges during the execution of the process of FIG. 3. A first vertical line 40 symbolizes the user, a second vertical line 42 symbolizes user interface 120 and network terminal device 122 of first user terminal 12 and a third vertical line 44 symbolizes shared database memory 20 and/or in address resolution database memory 124 of first user terminal 12.

The definition of the content of the message and the address describing data of first step 31 is symbolized by a first arrow 45 from the user to user interface 120. The information exchanged in third step 33 is symbolized by second and third arrows 46, 47 between user interface 120 and network terminal device 122 on one hand and shared database memory 20 and/or in address resolution database memory 124 of first user terminal 12 on the other hand. This involves a request from between user interface 120 and/or network terminal device 122 according to the elements derived from the address describing data by the user and a response to this request from shared database memory 20 and/or in address resolution database memory 124.

A fourth arrow 48 from user interface 120 to the user indicates the prompt for additional information by fourth step 34. Further first, second and third arrows 45a, 46a, 47a represent reception of additional information in fourth step 34 and a renewed query and response to shared database memory 20 and/or in address resolution database memory 124. Although only one such cycle of information exchange is shown, it should be understood that more cycles may be involved.

Arrows 470a, 470b indicate message involved with an optional confirmation of the selection by the user before fifth step 35, including a presentation message 470a to the user presenting the selection and a confirmation message back from the user. As noted, the exchange involving the prompt of fourth arrow 48 and further first, second and third arrows 45a, 46a, 47a may be omitted when confirmation of the selection by the user from a list is used.

A sixth arrow 49 indicates writing of information according to sixth step 36 from user interface 120 and/or network terminal device 122 on one hand to shared database memory 20 and/or in address resolution database memories 124, 144 of the first and second user terminals 12, 14 on the other hand.

Apart form adding new records representing assertions, records representing assertions may also be modified to record use made of the record. For example, in one embodiment each time a record representing an assertion is successfully used, fields of the record representing the identifier of the last successful user and/or the last successful result and/or the date of successful use may be updated. In another embodiment a dependent record with such information may be added. This enables the use of different instances of successful use to determine weight factors.

In an embodiment records representing assertions are added also in response to events such as communication between persons associated with the terminals at those addresses. Preferably this type of added assertion is made available at least to both terminals. Thus use of an element in first address describing data at a first user terminal may be used to enable future resolution of a destination address from second address describing data at the second terminal.

Prompting for External Information

In a second embodiment, at least part of the prompts for additional information about the destination is not directed at the user of the first terminal, who provided the original address describing data, but at one or more other user terminals. Thus, other user terminals are used to resolve ambiguity of the address describing data.

For example, if a user provides address describing data specifying a color printer in a specified region (for example a floor of a building), queries may be sent to all printers in the specified region to confirm or deny that they are a color printer.

In another simple example, when the original address describing data from first user terminal 12 specified "Adams, whom I contacted last week" and it proved impossible to find information about such a contact in a database, queries may be sent to the user terminals of all persons by the name of Adams in the data base, asking whether they have been contacted by the user of first terminal 12. When one or more of these persons named Adams respond to these queries, an assertion of such a contact may be added to the database.

Effectively, these queries may be invitations to fill in parameters of an assertion derived from the address describing data from the first user terminal 12. For example, if second step 32 produces an element (contacted, source=ID1, destination=X, date=date range defined by last week), the queried persons may effectively fill in parameters to obtain a record (contacted, source=ID1, destination=IDx, mode=mode specified by destination, date=date specified by destination), wherein IDx is the identifier of the person named Adams that responded.

Although this example concerns the case wherein a human user provides the additional information, it should be appreciated that alternatively or in addition information that is stored in other terminals may be used to supply additional information. That is, a data processor in user interface 140 or network terminal device 142 may be configured to receive queries from network 10 to fill in at least one parameter in an assertion, to retrieve information about the parameter from its address resolution database memory 144 and to return information that narrows down this parameter value. Typically, this comprises confirming that the identifier representing the user of second user terminal 14 is the value of one of the parameters that specifies a role played in the assertion.

For example, the records for output devices may have fields (device identifier, device address, device type, device location), with possible values of "device type" that include "printer" and "color printer" as a sub-class of "printer". Upon receiving address describing data that is parsed to (X, "color printer", <region>), a comparison with the list of records for destination devices may result in a list of device identifiers from the records whose device location attribute has a value within the specified <region> and whose device type attribute identifies a class that contains color printers, among others. In this case a query is sent addresses corresponding to all identifiers on this list to query whether they are of the color printer type. The result is used both to resolve the address describing data and to update the records for the devices.

Thus, profit is taken from the fact that the user found an assertion to be relevant to describe a destination and it is ensured that this assertion will be useful to resolve the destination in future.

Figure 5:
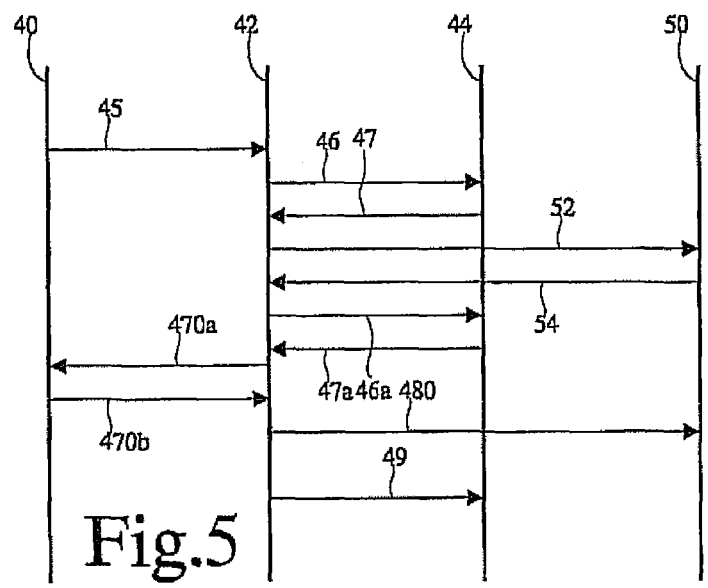
FIG. 5 illustrates information exchange

FIG. 5 shows communications involved in this embodiment. Compared to FIG. 4, a further line 50 representing a further user terminal has been added and fourth arrow 48 of the prompt and first arrow 45a of reception of a response have been replaced by first and second further arrows 52, 54 representing transmission of a query to the further user terminal instead of the prompt and reception back of a response. Although a single cycle of query and response is shown, it should be appreciated that any number of cycles may be used and that there may also be cycles of internal prompt and response in the first user terminal 12. Each cycle may provide for additional information.

Use of the Source of Information

Figures 6, 7:
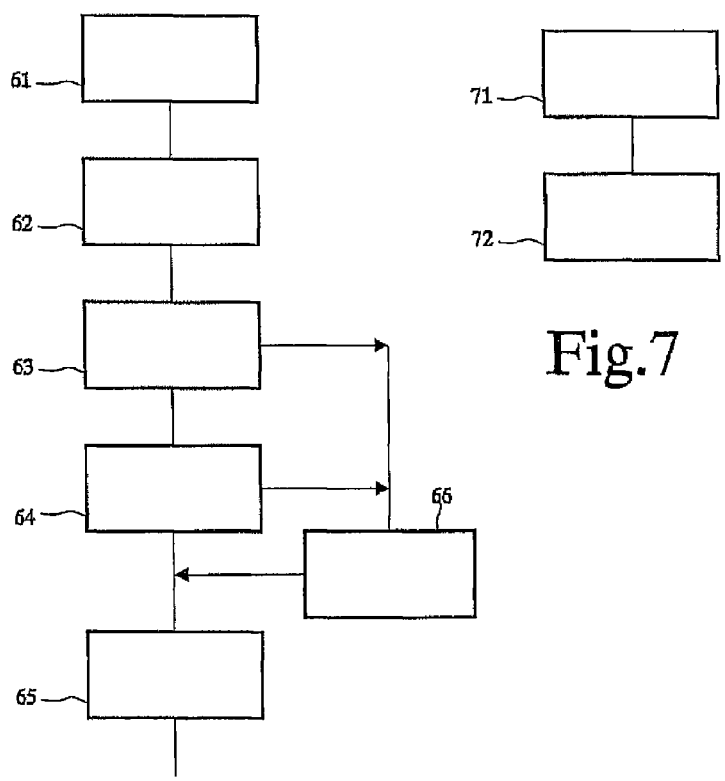
FIG. 6 shows a flow-chart of context sensitive resolution
FIG. 7 illustrates an alternative way of adding assertions

FIG. 6 illustrates an embodiment wherein source sensitive attribute values are used. Use is made of stored records relating attribute values to a destination ID dependent on context information such as a specifier ID of the entity that specified the attribute value. Assertions as described in the preceding may be augmented with a parameter that specifies the identifier (ID) of a party that specified the information in the assertion. As another example records may represent nicknames for destinations ID that have been specified by different specifying sources.

In a first step 61 an address describing data is received by first user terminal 12 with a first ID value. In a second step 62 a data processor of the terminal parses the address describing data. In a third step 63 the data processor of the terminal uses elements that have been obtained by parsing to search for a destination. The resolution process described by means of FIG. 3 may be used. In another example, if the address describing data comprises an attribute value of the destination, such as a name, third step 63 may involve searching the shared database memory 20 and/or the address resolution database memory 124 of the first terminal for records that assert that attribute value (e.g. a nickname) for a destination.

If one or more of such records are found, the data processor of the terminal executes a fourth step 64, extracting second ID values of the specifying sources of the assertion in the records found in third step 63. Fourth step 64 furthermore comprises a search for a match between properties associated with the first ID value and second ID value, of the user that entered the name in the first step 61. Thus, records are detected that have been specified earlier by a source that has similar properties as the user that specified the current address describing data. In one embodiment, matches may be realized by means of "buddy lists", a match being detected when the users indentified by the first and second ID value belong to the same buddy lists. A plurality of identifiers of different buddy lists may be defined and records may be defined that assert membership of users of buddy lists in terms of the identifiers to provide for a match upon detection of first and second ID values that belong to a common buddy list.

If a match between the properties associated with the first and second ID values is detected, the process proceeds to a fifth step 65, establishing communication to an address corresponding to the ID associated with the name. Thus, an attribute such as a nickname used in an address describing data may be used to translate the address describing data into a destination address only on condition that it was specified by another user in the same section of the building. If no match is found, a sixth step 66 may be executed to resolve the address describing data in another way first, for example as described in the preceding. Thus for example records may represent nicknames for destinations ID that have been provided by different specifying sources.

A predetermined set of property types may be provided to define the match. Typically, these properties are expressed in terms of attribute values associated with ID values. For example a match condition may be that location attributes associated with the first and second IDs refer to locations in a same section of a building.

In an embodiment a learning process may be used to establish the predetermined set of property types. For example, a learning process may be used wherein initially an empty set of property types is used, so that any specifying source will do. When this leads to one or more selectable destinations, the selected destination(s) is/are presented at the user interface to the person that supplied the address describing data and a confirmation or rejection of a selection is received back.

When a rejection is received back, differences are determined between the attributes values of the source of the address describing data and the specifying source of an assertion used to propose the rejected selection. An attribute type is selected for which the attribute values were different and optionally a threshold for the distance between the attribute values is generated that is less than the distance between the attribute values for that attribute type.

The selected attribute is added to the set of properties, optionally specifying that the distance between the attribute values should be less than the threshold (if no threshold is used, a requirement may be imposed that the attribute values are equal). In a more advanced process, selection of attributes may involve collecting information about a plurality of rejections and confirmations and selecting an attribute type that differs between the source of the address describing data and the specifying source or sources of a plurality of rejections and/or that match between the source of the address describing data and the specifying source or sources of one or more confirmations.

The stored records relating an attribute value to a destination ID in the context of a specifying source ID of the attribute value may be generated as a result of the process of FIG. 3 for using address describing data, by recording the source of the address describing data in the added assertions.

FIG. 7 illustrates an alternative way of adding such assertions outside the context of describing a destination. In a first step 71, user interface 120 receives an attribute value for an identified destination in an assertion of a type that specifies a value of an attribute and that has an attribute value and a source of the attribute value as parameters. An assertion of the type (name, ID1, nickname, <name value>, ID2) may be used, wherein ID1 is the ID of the destination to which the name value applies, ID2 is the ID of the source of the name, that is the person that added the name value, and "nickname" indicates that the name is a nickname. In another embodiment a more general assertion type (context sensitive attribute, attribute type=nickname, ID1, attribute value=name, ID2) may be used.

In a second step 72 a data processor in first terminal adds the assertion to shared database memory 20 and/or in address resolution database memories 124, 144 of the first and second user terminals 12, 14. These steps may be repeated by different users and/or for different attributes.

Although embodiments have been shown wherein the specifying source is added as a parameter to the assertion, it should be appreciated that it may suffice to add the parameter values of the specifying source that are needed for matching. Thus instead of a specifying source parameter, an "attribute of the specifying source" parameter may be used. For example, when only a location of the specifying source is used for matching, addition of a "location of the specifying source" parameter to the assertion may suffice to provide the information needed for matching.

Although an embodiment has been shown wherein the methods of adding the parameter about the specifying source is to include the use of the source of an address describing data, it should be appreciated that the use of such a parameter is possible also if no use is made of any source of address describing data to define the parameter.

As will be appreciated the described system involves the determination of an address of a destination of a connection through a network 10, based on address describing data. Address describing data is used that need not explicitly specify the address of the destination. A shared database of the network or a local database in a user terminal is used to translate the address describing data into a destination address for use to establish the connection.

Once the address describing data has been resolved, if need be by prompting a user for more information, it is determined whether the address describing data contained an element that could not be translated by the database. If so, the database is updated by adding an assertion that makes it possible to use the element to resolve the address, so that an identical element in future address describing data will be useful for future resolution. Preferably, this information is made available for resolution of address describing data from a plurality of different terminals and users.

It should be appreciated that the resolution of address describing data by means of support information and management of the support information may be performed in a user terminal or in other equipment, such as a server coupled to network 10. The resolution of address describing data may even be performed in a distributed way, partly at a user terminal and partly elsewhere. In general any device or system of devices that performs these actions will be referred to as network address resolution equipment. The address resolution equipment is directly or indirectly coupled to network 10 to supply addresses for controlling routing through network 10.

Where the term user is used in this description to describe acts of persons, this term refers to such person. Elsewhere, the term "user" refers to a user account maintained by the system. Data associating with users items of information associates such user accounts with such items.

A programmable data processor may be used with a program memory that stores instructions of a program to cause the data processor to perform the functions as described. As used herein, phrases that state that a data processor is configured to perform specified functions mean that the data processor is a programmable data processor with a program memory that stores instructions of a program to make the data processor execute the indicated functions or that the data processor has circuitry designed to make the data processor perform the indicated functions.

The invention claimed is:

1. A method of supplying a destination address to control of routing of data through a network, the method comprising
   receiving address describing data from a first user via a source terminal that is coupled to the network;
   determining in a control circuit whether the address describing data is sufficient to resolve an address of a destination;
   if it has been determined that the address describing data is sufficient to resolve the address, routing data through the network from the source terminal directed at the address resolved from the address describing data; and if not
   transmitting a confirmation request from the control circuit to at least one further terminal over the network, the confirmation request requesting confirmation whether information derived from the address describing data relates to the further terminal and/or confirmation whether the information relates to a second user of the further terminal,
   receiving a response to the confirmation request from the further terminal to the control circuit;
   routing data through the network from the source terminal directed at the address of the further terminal or the second user dependent on whether the response confirms that the information from the address describing data relates to the further terminal or the second user.

2. A method according to claim 1, comprising selecting a list of a plurality of possible destinations that are consistent with the address describing data and transmitting confirmation requests to respective ones of the possible destinations from said list to request confirmation from each respective one of the possible destination whether the information relates to the respective ones of the possible destinations.

3. A method according to claim 1, comprising
   storing a record representing that the information relates to the further terminal or the second user in response to reception of the response when the response confirms that information relates to the further terminal or the second user,
   subsequently receiving further address describing data,
   comparing further information from the further address describing data with the information represented by the stored record and
   routing further data through the network directed at the destination address of the further terminal or the second user responsive to detection of a match between the further information and the information represented by the stored record.

4. A method according to claim 3, comprising
   storing data associating the first user with the record;
   comparing at least an attribute of a source of the further address describing data with a corresponding attribute of the source of the address describing data;
   routing further data through the network directed at the destination address of the second user dependent on whether the attributes of the sources of the address describing data and the further address describing data match each other.

5. A method according to claim 1, comprising
   storing a record representing that the information relates to the second user and data associating the first user with the record,
   subsequently receiving a further address describing data,
   comparing further information from the further address describing data with the information represented by the stored record and
   comparing the further user to which the information relates with a further source of the further address describing data;
   routing further data through the network directed at the destination address corresponding to the first user, responsive to detection of a match between the further information and the information represented by the stored record and a match between the second user and the further source.

6. A method according to claim 1, wherein the information derived from the address describing data comprises information that describes a mutual relation between the first user and the second user.

7. A method according to claim 1, wherein the information defining a capability of the further terminal, the confirmation request querying the further terminal whether it has said capability, the further terminal being configured to report said capability.

8. Network address resolution equipment, comprising
   an input configured to receive address describing data from a first user via a source terminal, the address describing data;
   a control circuit configured to determine whether the address describing data is sufficient to resolve an address of a destination; if it has been determined that the address describing data is sufficient to resolve the address, to route data through the network from the source terminal directed at the address resolved from the address describing data and if not to transmit a confirmation request to at least one further terminal over the network, the confirmation request requesting confirmation whether information derived from the address describing relates to the further terminal and/or confirmation whether the information relates to a second user of the further terminal, to receive a response to the confirmation request from the further terminal to the control circuit and to supply a destination address for control of routing of data through the network, the destination address being selected dependent on whether the response confirms that the information from the address describing data relates to the further terminal or the second user, the destination address corresponding to the further terminal or the second user when the response confirms that the information from the address describing data relates to the further terminal or the second user.

9. Network address resolution equipment according to claim 8, wherein the control circuit is configured to select a list of a plurality of possible destinations that are consistent with the address describing data and to transmit confirmation requests to respective ones of the possible destinations from said list to request confirmation from each respective one of the possible destination whether the information relates to the respective ones of the possible destinations.

10. Network address resolution equipment according to claim 8, comprising a storage device for storage of address resolution information, the control circuit being configured to store a record representing that the information relates to the further terminal or the second user in response to reception of the response when the response confirms that information relates to the further terminal or the second user and subsequently to receive further address describing data, to compare further information from the further address describing data with the information represented by the stored record and to supply a further destination address for control of routing of further data through the network directed at the destination address of the further terminal or the second user responsive to detection of a match between the further information and the information represented by the stored record.

11. A computer program product comprising a non-transitory computer readable medium having a computer program embodied thereon, the computer program including instructions for causing a processor to:

receive address describing data from a first user via a source terminal that is coupled to the network;

determine whether the address describing data is sufficient to resolve an address of a destination;

if it has been determined that the address describing data is sufficient to resolve the address, route data through the network from the source terminal directed at the address resolved from the address describing data; and if not transmit a confirmation request to at least one further terminal over the network, the confirmation request requesting confirmation whether information derived from the address describing relates to the further terminal and/or confirmation whether the information relates to a second user of the further terminal, receive a response to the confirmation request from the further terminal to the control circuit;

supply a destination address for controlling routing of data through the network from the source terminal directed at the further terminal or the second user, dependent on whether the response confirms that the information from the address describing data relates to the further terminal or the second user.

\* \* \* \* \*